United States Patent
Gallas

[11] Patent Number: 5,826,378
[45] Date of Patent: Oct. 27, 1998

[54] SEALING STRIPS

[75] Inventor: Gerard Gallas, Nantes, France

[73] Assignee: Draftex Industries Limited, Edinburgh, Scotland

[21] Appl. No.: 646,681

[22] Filed: May 10, 1996

Related U.S. Application Data

[63] Continuation-in-part of Ser. No. 184,561, Jan. 21, 1994, abandoned.

[51] Int. Cl.⁶ ........................................ E06B 7/22
[52] U.S. Cl. ................... 49/498.1; 49/475.1; 277/184
[58] Field of Search ................. 277/184; 49/475.1, 49/478.1, 490.1, 498.1

[56] References Cited

U.S. PATENT DOCUMENTS

| | | | |
|---|---|---|---|
| 2,226,354 | 12/1940 | Barr | 49/475.1 |
| 4,455,785 | 6/1984 | Wahr et al. | 49/498.1 |
| 4,676,493 | 6/1987 | Helbig | 49/475.1 |
| 4,926,600 | 5/1990 | Mesnel | 49/490.1 |
| 4,929,490 | 5/1990 | Iwasa | 49/475.1 |
| 5,050,349 | 9/1991 | Goto et al. | |

FOREIGN PATENT DOCUMENTS

| | | | |
|---|---|---|---|
| 0138208 | 8/1950 | Australia | 49/498.1 |
| 0613800 | 9/1994 | European Pat. Off. | |
| 0644350 | 3/1995 | European Pat. Off. | |
| 59-040937 | 3/1984 | Japan | |

OTHER PUBLICATIONS

Patent Abstracts of Japan, vol. 8, No. 143 (M–306) [1580] 4 Jul. 1984, JP-A-59 0409037.

*Primary Examiner*—Daniel G. DePumpo
*Attorney, Agent, or Firm*—Leydig, Voit & Mayer, Ltd.

[57] ABSTRACT

A sealing strip for sealing between a flange defining the door opening, such as in a motor vehicle body, and the door of the opening, comprises a channel-shaped gripping part for gripping the flange and supporting a hollow tubular sealing part, preferably made of sponge rubber. The latter is partially compressed between the flange and the closing door so as to provide a barrier against ingress of moisture and draft. In order to provide improved blocking of acoustic energy, so as to reduce the amount of exterior noise (road noise, aerodynamic noise) transmitted into the interior of the the vehicle, the hollow tubular sealing part supports a metal wire running lengthwise along and within the hollow tube and supported from the tubular side wall so as to be capable of vibrating in a transverse direction. The mass of the wire and the rigidity with which it is supported are such that the resonant frequency with which the wire vibrates is less than a frequency band of acoustic energy to be attenuated, whereby the additional material tends to vibrate in opposition to, and thus attenuates, acoustic energy within that frequency band.

22 Claims, 6 Drawing Sheets

SEALING STRIPS

RELATED APPLICATION

This application is a continuation-in-part of application Ser. No. 08/184,561 filed Jan. 21, 1994 and now abandoned.

BACKGROUND OF THE INVENTION

The invention relates to sealing strips. An example of the invention, to be described in detail below, is a sealing strip for sealing around a closable opening in a vehicle body.

BRIEF SUMMARY OF THE INVENTION

According to the invention, there is provided a sealing strip for sealing around at least part of the frame of an opening closable by a closure member, comprising longitudinally extending compressible material positioned to be compressed between the frame and the closing closure member to provide a barrier seal, and additional metallic material positioned on or in the compressible material and providing an increase in the mass of the compressible material so as to attenuate acoustic wave energy tending to pass between the frame and the closed closure member.

According to the invention, there is further provided a sealing strip for sealing around at least part of a frame extending around an external opening of a motor vehicle closable by a closure member, comprising compressible material having a longitudinal extension corresponding to at least the said part of the frame and positioned to be compressed between the frame and the closing closure member to provide a sealing barrier therebetween, the compressible material supporting a length of metal wire having a predetermined mass and extending along at least part of said longitudinal extension, the wire being supported with a predetermined degree of rigidity from the compressible material for mechanical vibration transversely of the length of the wire in response to acoustic energy which arises externally of the vehicle, the predetermined mass of the metal wire and the predetermined rigidity with which it is supported providing a resonant frequency of vibration of the wire which is less than a frequency band of said acoustic energy, the wire thereby tending to vibrate in opposition to, and to attenuate, acoustic energy within that frequency band.

DESCRIPTION OF THE DRAWINGS

Sealing strips embodying the invention will now be described by way of example only, with reference to the accompanying drawings in which.

DESCRIPTION OF PREFERRED EMBODIMENTS

Figure 1:
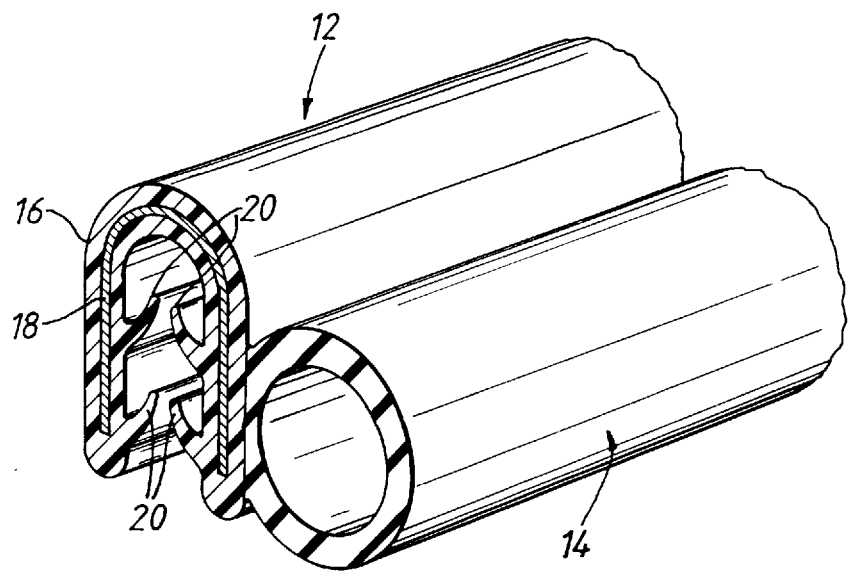
FIG. 1 is a perspective view of a known form of sealing strip.

In all the Figures, corresponding parts are indicated by the same reference numerals.

Figure 2:
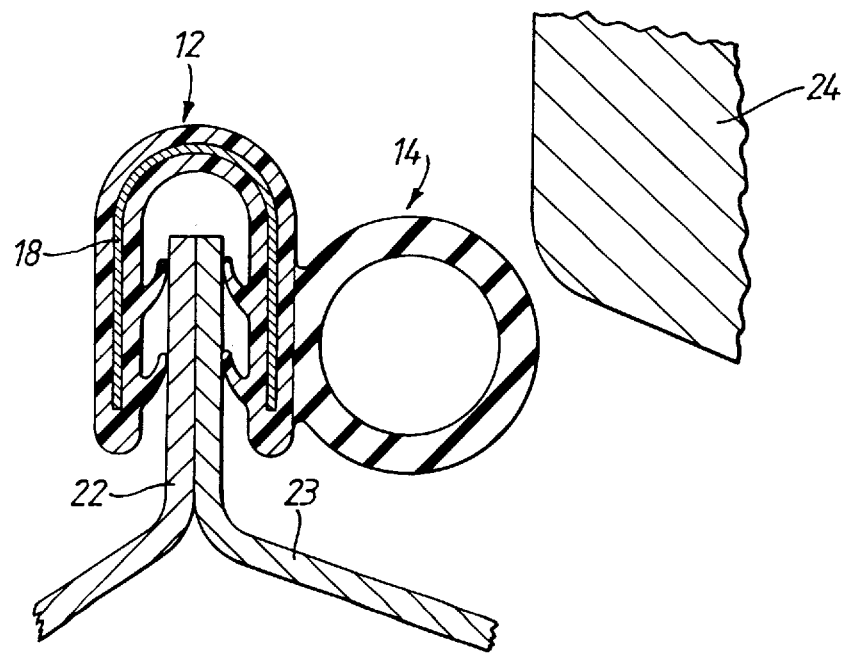
FIG. 2 is a cross-section through the sealing strip of FIG. 1, but showing it mounted on a bodywork flange surrounding a door opening in a vehicle body.
Figure 3:
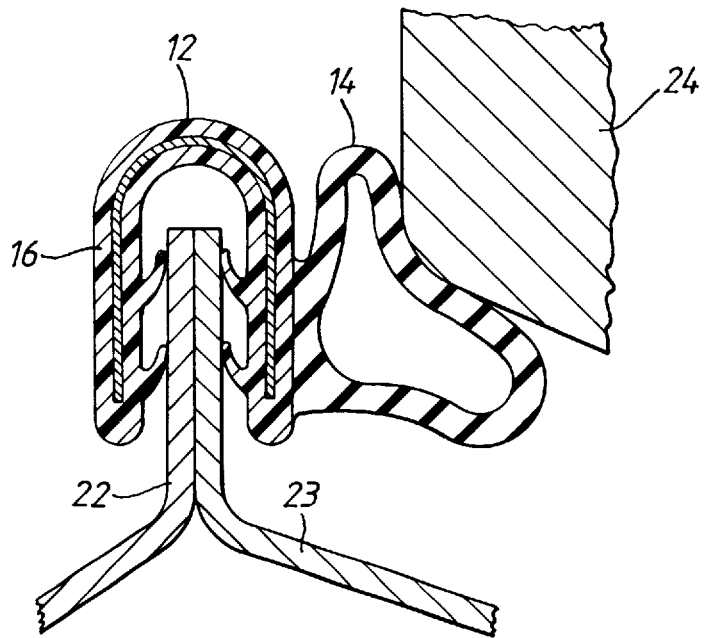
FIG. 3 corresponds to FIG. 2 but shows the configuration which the sealing strip adopts when the door closes in the opening.

The sealing strip of FIGS. 1,2 and 3 comprises a longitudinally extending channel-shaped gripping part 12 on one outside wall of which is mounted a co-extending tubular sealing part 14. The gripping part 12 comprises extruded material, such as plastics or rubber material 16, in which is embedded a reinforcing core or carrier 18. The carrier 18 may take any suitable form. It may be made of metal which may be apertured at intervals along its length. In one form, the carrier comprises U-shaped elements arranged side by side along the length of the carrier to define a channel and either completely disconnected from each other or connected together by short integral connecting links. Instead, wire looped to and fro around the channel and along its length can be used. However, other forms of carrier construction are possible.

The gripping part 12 is preferably produced by a cross-head extrusion process.

The sealing part 14 is preferably made of soft rubber, such as sponge or cellular rubber. The sealing part 14 may again be made by an extrusion process. It may be made separately from the gripping part, and then adhesively attached to the gripping part in a separate operation. Instead, however, the whole sealing strip may be made by simultaneous extrusion.

The extruded material 16 of the gripping part 12 is preferably extruded with integral gripping lips 20 mounted on the inside facing walls of the channel. The extrusion process may be arranged so that the material of these gripping lips is softer than the remainder of the extruded material 18.

In use, the sealing strip is mounted around the frame of a door or other closable opening in a motor vehicle body by fitting the gripping part 12 onto the flange 22 (FIG. 2) which extends around the opening and is formed where the inner and outer panels of the bodywork are brought together at the opening and welded. The configuration of the gripping part is such that it tightly grips the flange 22, this gripping action being assisted by the lips 20. In this way, therefore, the gripping part 12 supports the sealing part 14 so that the latter runs around the periphery of the opening and faces towards the door 24 or other closure member for the opening.

FIG. 3 shows how the closing door 24 partially compresses the sealing part 14 to provide an effective seal around the opening against draught and water or moisture.

Figure 4:
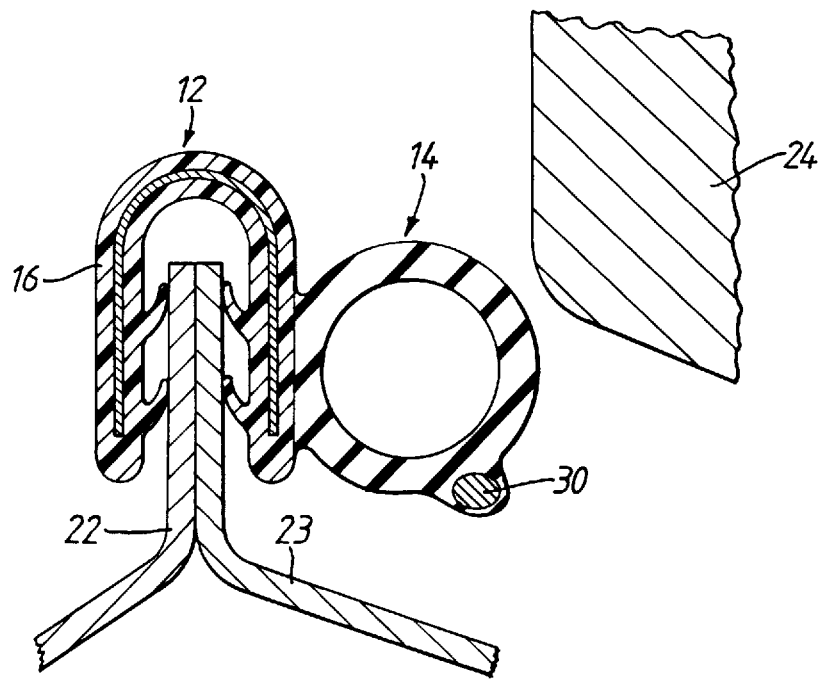
FIG. 4 is a cross-section corresponding to FIG. 2 but showing a sealing strip embodying the invention.

FIG. 4 corresponds to FIG. 2 but shows one of the sealing strips embodying the invention.

The normal material of the sealing part 14 (sponge or cellular rubber), although providing excellent sealing properties against ingress of draught, water or moisture, provides poor acoustic screening properties. Therefore, a sealing strip of the form shown in FIGS. 1 to 3 provides poor attenuation of external noise (such as road noise or aerodynamic noise), and thus provides low resistance to the transmission of such exterior noise into the interior of the vehicle. The sealing strip of FIG. 4 is intended to mitigate this problem.

When an acoustic wave strikes the elastic material of the sealing part 14, part of the acoustic energy passes through the wall, another part is reflected and some is absorbed. The amount of energy passing through the wall and the amount reflected respectively depend on the acoustic impedance of the wall, that is, on its mass and rigidity. The greater the mass of the wall and its rigidity, the greater will be its acoustic impedance and, consequently, the lower will be the wave energy passing through the wall. In the case of the sealing strip shown in FIGS. 1 to 3, the material of the sealing part has a very low acoustic impedance and a significant part of the acoustic energy thus passes through the sealing part into the interior of the vehicle.

Figure 5:
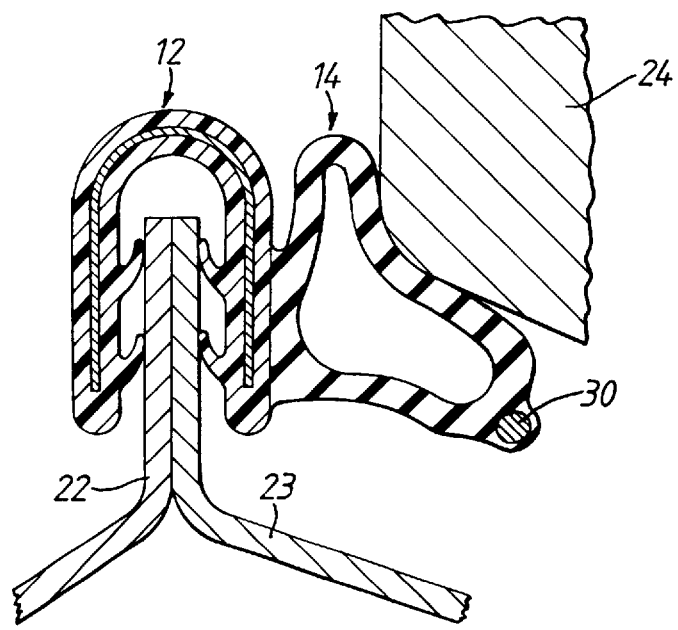
FIG. 5 corresponds to FIG. 4 but shows the configuration which the sealing strip adopts when the door closes into the opening.

In the case of the sealing strip shown in FIGS. 4 and 5, however, the amount of acoustic energy passing through the sealing part 14 when the door is closed (FIG. 5) is greatly reduced by the provision of an embedded metallic wire 30 which runs longitudinally along the length (or part of the length) of the strip, the wire being mounted on the outside of the sealing part 14 and covered by the material of the sealing part or other material. The metallic wire 30 increases the mass of the wall of the sealing part 14 and significantly reduces the transmission of acoustic energy into the vehicle. The wire 30 will tend to decrease the flexibility of the sealing part 14, thus tending to increase the effort required for closing the door. Therefore, the wire 30 is positioned on the sealing part 14 so as to minimise its effect on the latter's compressibility. As shown in FIG. 5, it is positioned on the sealing part so that, when the door 24 is closed, the wire 30 is neither in contact with the door nor with the bodywork 23 adjacent the opening.

The wire 30 can be secured to the material of the sealing part 14 by adhesive and preferably covered with rubber or similar material. Advantageously, though, it is inserted by co-extrusion with the remainder of the material of the sealing part.

In the sealing strip of FIGS. 4 and 5, the wire 30 is positioned on the outside of the sealing part 14.

Figure 6:
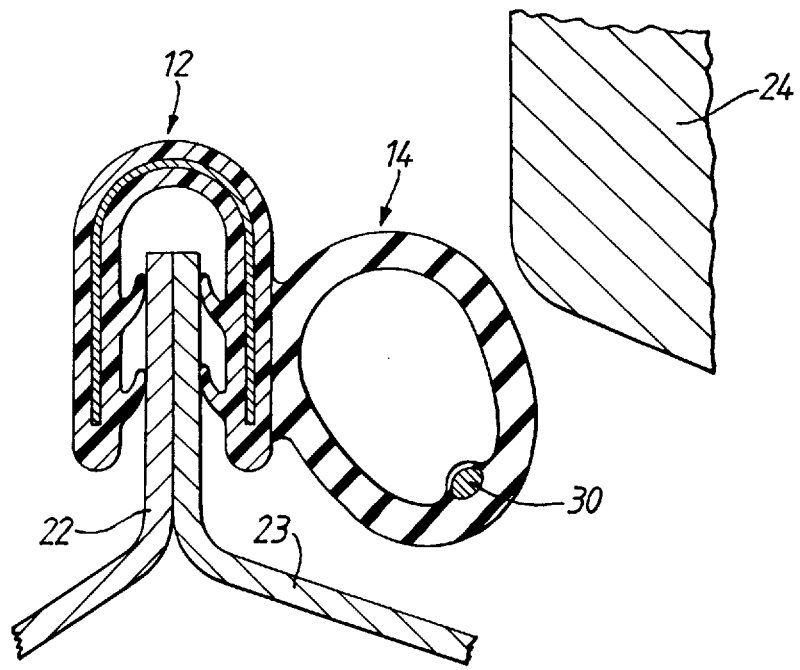
FIGS. 6 and 7 correspond respectively to FIGS. 4 and 5 but show a different form of sealing strip embodying the invention.
Figure 7:
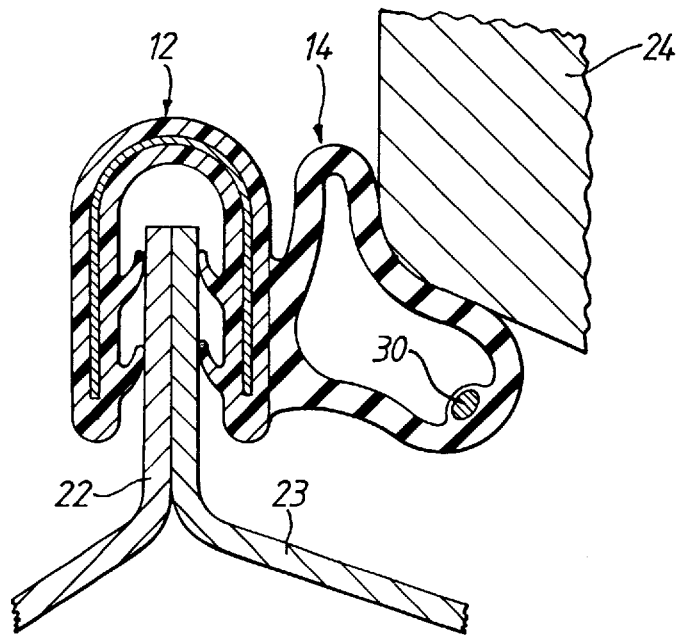

FIGS. 6 and 7 correspond to FIGS. 4 and 5 but show an arrangement in which the wire 30 is provided on the inside of the wall of the hollow sealing part 14 instead of on the outside. The construction and operation is otherwise the same. In this case, the wire 30 is inserted by co-extrusion with the remainder of the sealing part 14.

Figure 8:
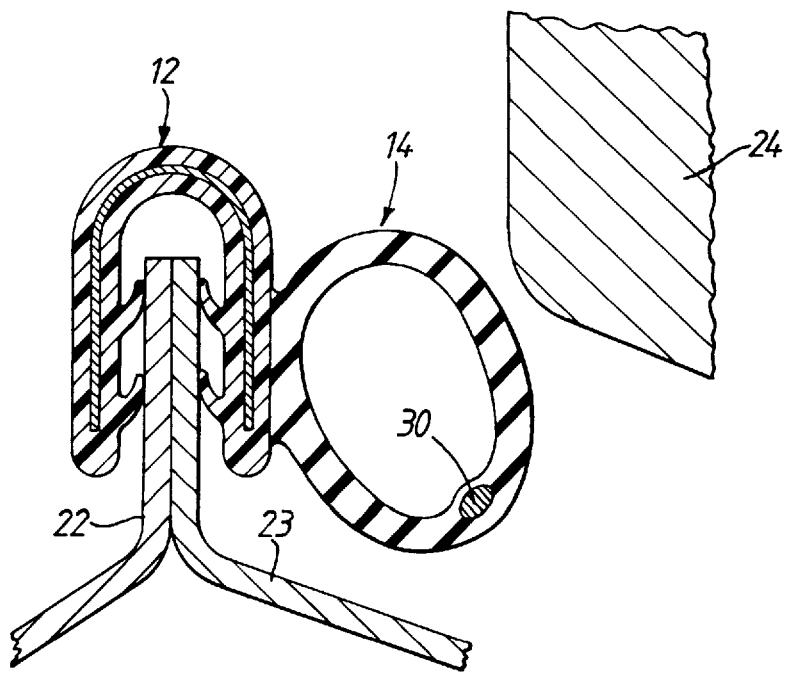
FIGS. 8 and 9 correspond to FIGS. 4 and 5 but show a further form of sealing strip embodying the invention.
Figure 9:
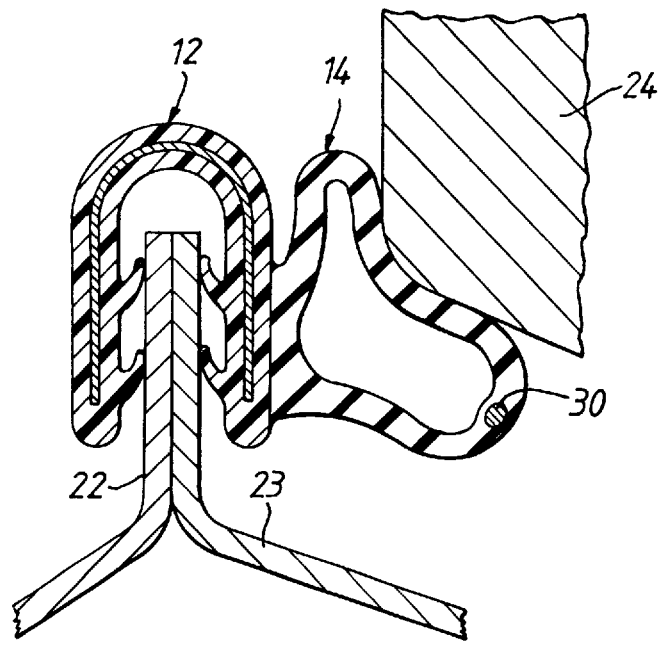

FIGS. 8 and 9 show a modification in which the wire 30 is embedded in the wall itself of the sealing part.

Although FIGS. 4 to 9 show the use of a sealing part 14 of hollow configuration, the sealing part may in certain circumstances take the form of a lip. In such a case, the wire 30 may be provided in the same way as described.

Figure 10:
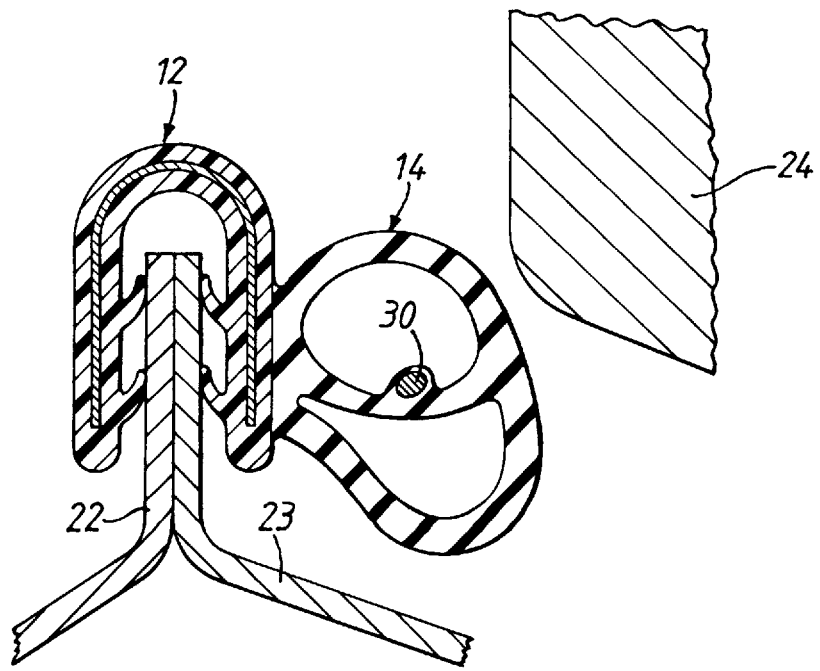
FIGS. 10 and 11 correspond to FIGS. 4 and 5 but show yet a further form of sealing strip embodying the invention.
Figure 11:
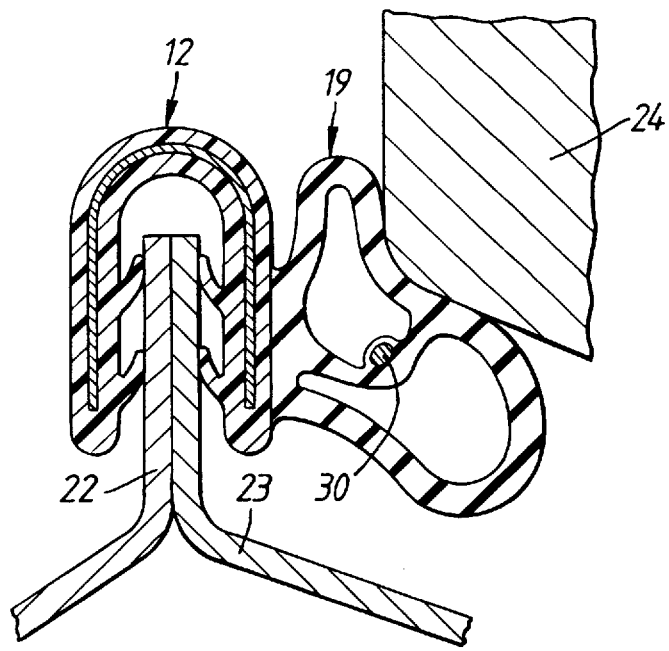

FIGS. 10 and 11 show another form in which the sealing part 14 is provided with a dividing wall 34. The wire 30 is mounted (preferably by co-extrusion) on one side of this dividing wall. The construction and operation is otherwise the same as for the other examples shown in FIGS. 4 to 9.

Figure 12:
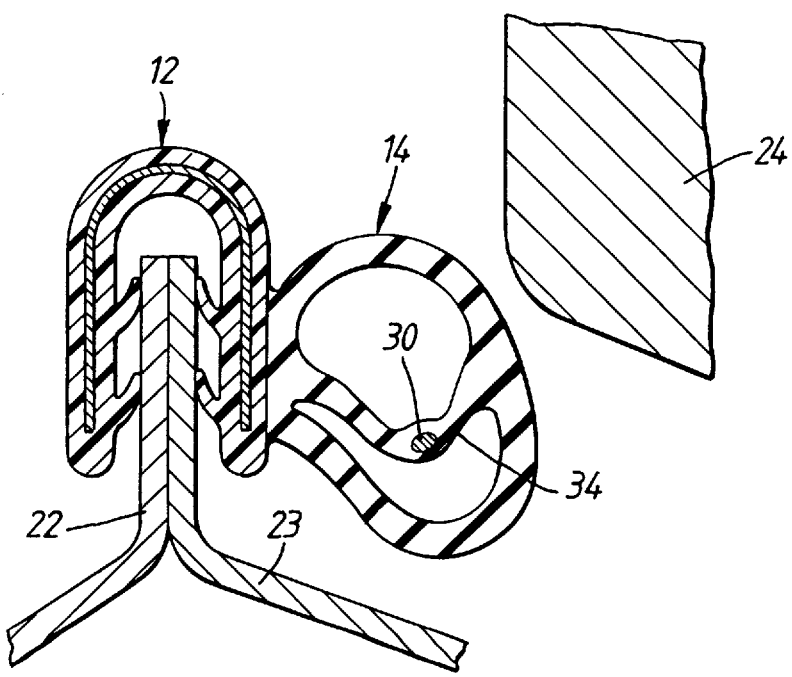
FIG. 12 corresponds to FIG. 4 and shows a still further form of sealing strip embodying the invention.

The sealing strip shown in FIG. 12 is similar to that shown in FIGS. 10 and 11, except that the wire 30 is embedded in the dividing wall 34 itself.

Preferably, the mass of the wire 30 is selected to maximise the acoustic screening effect.

Thus if m is the mass of the acoustic screen 30 and k is the rigidity of the wall in or on which it is mounted, the assembly comprising the wire 30 and the wall will have a resonant frequency f, where $$f = \frac{1}{2\pi} \cdot \sqrt{(k/m)}$$

Therefore, incident acoustic wave energy at the frequency f will cause the wire 30 and its supporting wall to resonate at this frequency. However, incident acoustic wave energy at frequencies above f will cause the wire and the wall to vibrate in opposition to the incident energy. The acoustic impedance and thus the acoustic screening effect will be increased or reinforced. The amount of acoustic energy reflected by the wire 30 will be increased by the resultant vibration of the mass m.

Therefore, by selecting the mass m and the rigidity k in dependence on the primary frequency band of the acoustic energy to be attenuated, the attenuation effect can be considerably increased. The resonant frequency should be low relative to the passband of the human ear (which is from about 20 Hz to about 20 kHz). A value for the resonant frequency of about 30 to 50 Hz may be used, for example.

It is necessary, though, to ensure that the mass m is not increased to such an extent that the resultant volume of the wire 30 causes the latter to come into contact with the internal wall of the sealing part 14 at maximum deformation. The optimum geometry for the wire 30 can be obtained by computer-aided design.

It is found to be particularly advantageous to implement the acoustic screen by the length of metal wire 30 in the manner illustrated. Metal wire can easily be selected so as to have the necessary mass for providing adequate damping in accordance with the equation described above. The wire can be incorporated into the sealing part 14 using a known cross-head extrusion process for example.

Because of the relatively great mass of metal wire per unit length, the metal wire can be of relatively small diameter, and the problem that, at maximum deformation of vibration, it may come into contact with the internal wall of the sealing part 14 is not likely to arise.

In the embodiments described with reference to FIGS. 3 to 12, the wire 30 is shown embedded in or on the compressible material of the sealing part 14. Instead, however, the material in or on which the wire 30 is embedded may be material selected to have good sound deadening properties and, for example, co-extruded with the compressible material.

I claim:

1. A closure arrangement for an opening, comprising a frame of the opening, a closure member movable towards the frame to close the opening, and a sealing strip for sealing around at least part of the frame when the opening is closed by the closure member, the sealing strip comprising longitudinally extending compressible material having a first portion positioned to be compressed between the frame and the closing closure member to seal around said at least part of the frame, said longitudinally extending compressible material having a second portion positioned so as to be substantially uncompressed between the frame and the closing closure member, and metallic material carried by said second portion of the compressible material and providing an increase in the mass of the compressible material so as to attenuate acoustic energy tending to pass between the frame and the closed closure member.

2. An arrangement according to claim 1, in which the compressible material is in the form of a hollow tube which is partially collaped by compression by the closing closure member, and the metallic material is mounted on a part of a wall of the tube which constitutes said second portion of the compressible material and which is clear of both the closing closure member and the frame.

3. An arrangement according to claim 2, in which the metallic material is positioned on the outside of the wall of the tube.

4. An arrangement according to claim 2, in which the metallic material is positioned on the inside of the wall of the tube.

5. An arrangement according to claim 2, in which the metallic material is positioned in the wall of the tube.

6. An arrangement according to claim 1, in which said first portion of the compressible material is in the form of a hollow tube which is positioned to be partially collapsed between the closing closure member and the frame, the tube having an internal partition wall which constitutes said second portion of the compressible material and which carries the metallic material.

7. An arrangement according to claim 1, in which the metallic material is carried on said second portion of the compressible material by being co-extruded therewith.

8. An arrangement according to claim 1, in which the mass of the metallic material and the density of said second portion of the compressible material are so selected in relation to the frequency of the acoustic wave energy to be attentuated as to provide dynamic attenuation of the acoustic energy.

9. An arrangement according to claim 8, in which the mass of the metallic material and the rigidity with which it is supported by said second portion of the compressible material provide a resonant frequency of vibration of the metallic material which is less than a frequency band of said acoustic energy.

10. An arrangement according to claim 1, in which the sealing strip is mounted on a channel-shaped gripping part adapted to engage the frame.

11. An arrangement according to claim 1, in which the compressible material is soft rubber.

12. An arrangement according to claim 1, in which the metallic material is a length of metal wire extending continuously along at least part of the longitudinal extension of the compressible material.

13. A closure arrangement for closing an external opening of a motor vehicle, comprising a frame extending around the opening, a closure member for closing the opening, and a sealing strip for sealing around at least part of the frame when the opening is closed by the closure member, the sealing strip comprising a first portion of compressible material having a longitudinal extension corresponding to said at least part of the frame and positioned to be compressed between the frame and the closing closure member to provide a sealing barrier therebetween, a second portion of compressible material integral with and having a longitudinal extension corresponding with said first portion of compressible material, said second portion of compressible material being positioned so as to be substantially uncompressed between the frame and the closing closure member, the second portion of compressible material supporting a length of metal wire having a predetermined mass and extending along at least part of said longitudinal extension, the wire being supported with a predetermined degree of rigidity from said second portion of the compressible material for mechanical vibration in response to acoustic energy which arises externally of the vehicle, the predetermined mass of the metal wire and the predetermined rigidity with which it is supported providing a resonant frequency of vibration of the wire which is less than a frequency band of said acoustic energy, the wire thereby tending to vibrate in opposition to, and to attenuate, acoustic energy within that frequency band.

14. An arrangement according to claim 13, in which said first and second portions of the compressible material are together in the form of a tubular wall defining a longitudinally extending hollow tube, said second portion of the compressible material being so positioned in relation to said first portion thereof, and the cross-sectional size of the wire and the predetermined rigidity with which it is supported by said second portion of compressible material being so selected, that the wire when vibrating does not contact the tubular wall of the hollow tube when the latter is compressed by the closing closure member.

15. An arrangement according to claim 14, in which the wire is mounted on a surface of the tubular wall outside the tube.

16. An arrangement according to claim 14, in which the wire is mounted on a surface of the tubular wall inside the tube.

17. An arrangement according to claim 14, in which the wire is embedded in the tubular wall.

18. An arrangement according to claim 13, in which the wire is covered by elastomeric material.

19. An arrangement according to claim 13, in which the wire is embedded in said second portion of the compressible material.

20. An arrangement according to claim 14, in which said second portion of the compressible material defines a partition wall extending along at least part of the longitudinal extension of the tube and also extending across the hollow interior of the tube, the wire being supported on the partition wall.

21. An arrangement according to claim 13, in which the sealing strip is mounted on a channel-shaped gripping part which is adapted to engage the frame.

22. An arrangement according to claim 13, in which the compressible material is soft rubber.

* * * * *